United States Patent
Okamoto

(10) Patent No.: US 6,777,123 B2
(45) Date of Patent: Aug. 17, 2004

(54) COMBUSTOR TEMPERATURE CONTROL OF FUEL CELL POWER PLANT

(75) Inventor: Masaru Okamoto, Yokosuka (JP)

(73) Assignee: Nissan Motor Co., Ltd., Kanagawa (JP)

(*) Notice: Subject to any disclaimer, the term of this patent is extended or adjusted under 35 U.S.C. 154(b) by 266 days.

(21) Appl. No.: 10/153,623

(22) Filed: May 24, 2002

(65) Prior Publication Data

US 2002/0182460 A1 Dec. 5, 2002

(30) Foreign Application Priority Data

May 25, 2001 (JP) ......................................... 2001-157049

(51) Int. Cl.[7] .............................................. H01M 8/04
(52) U.S. Cl. .............................. 429/24; 429/17; 429/20; 429/22; 429/23
(58) Field of Search ................... 429/24, 23, 20, 429/17, 22

(56) References Cited

U.S. PATENT DOCUMENTS 6,582,841 B2 * 6/2003 Okamoto et al. ............. 429/13
6,613,465 B2 * 9/2003 Yamaoka et al. ............. 429/13

FOREIGN PATENT DOCUMENTS

| EP | 0 798 798 | 10/1997 |
|---|---|---|
| EP | 0 957 063 | 11/1999 |
| EP | 1 122 805 | 8/2001 |
| EP | 1 160 902 | 12/2001 |
| EP | 1 211 744 | 6/2002 |
| JP | 62-278767 | 12/1987 |
| JP | 4-15706 | 1/1992 |
| JP | 9-512120 | 10/1995 |
| JP | 9-315801 | 12/1997 |
| JP | 2000-178001 | 6/2000 |
| JP | 2000-185903 | 7/2000 |
| JP | 2001-84005 | 3/2001 |

* cited by examiner

Primary Examiner—John S. Maples
(74) Attorney, Agent, or Firm—McDermott Will & Emery LLP

(57) ABSTRACT

A reformer (6) generates hydrogen rich gas from vaporized methanol and a fuel cell stack (8) generates electric power by a reaction of hydrogen rich gas. A combustor (10) generates heat due to combustion of fuel and supplies it to a vaporizer (5) for vaporizing liquid methanol. A controller (100) increases a fuel supply amount to the combustor (10) when the methanol supply amount to the vaporizer (5) is increased. The controller also calculates a prediction temperatures of the combustor (10) (S5) and suppresses the fuel supply amount when any one of the prediction temperature is lower than a predetermined temperature (S6, S8A).

9 Claims, 7 Drawing Sheets

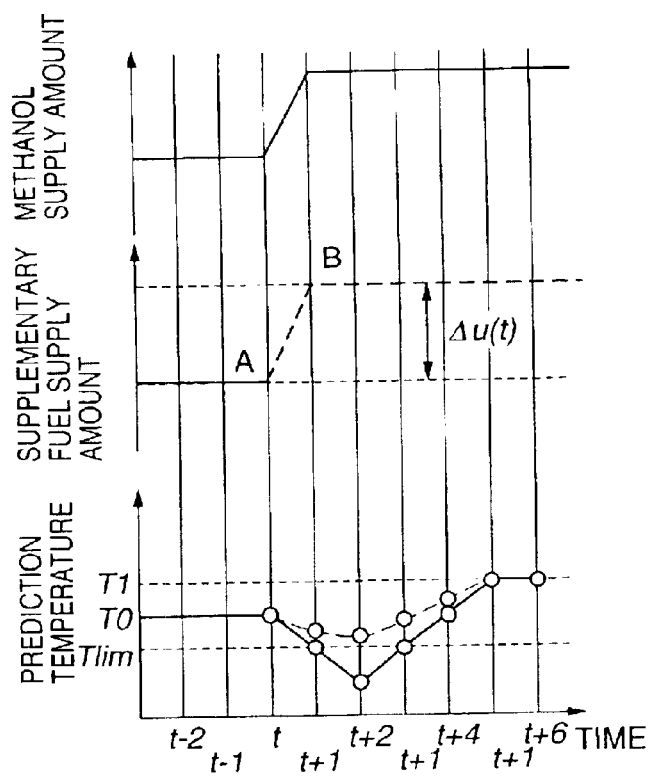
FIG. 3A
FIG. 3B
FIG. 3C
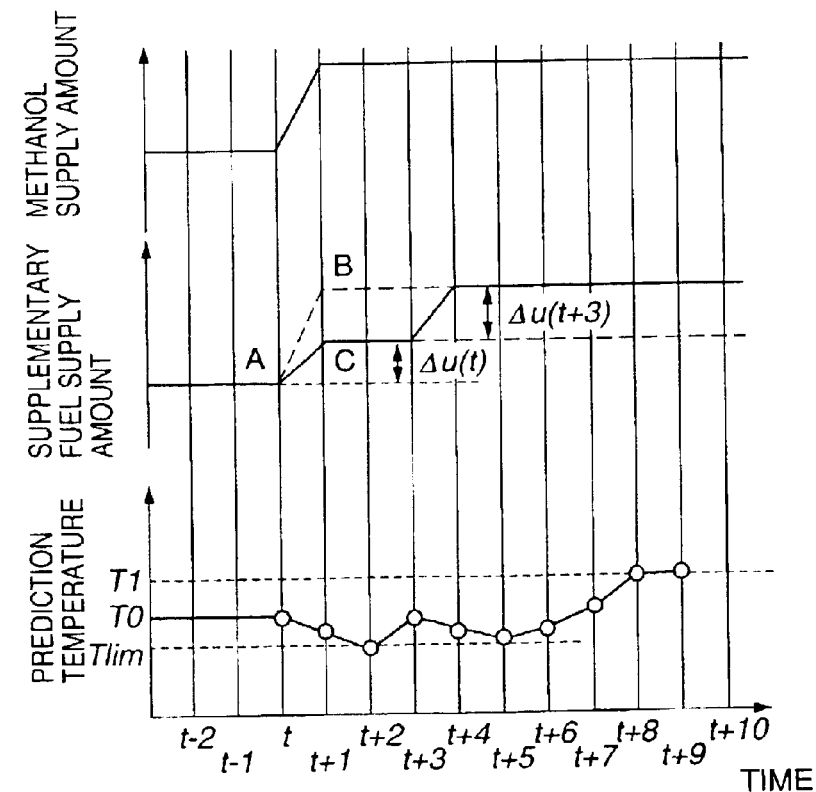
FIG. 4A
FIG. 4B
FIG. 4C

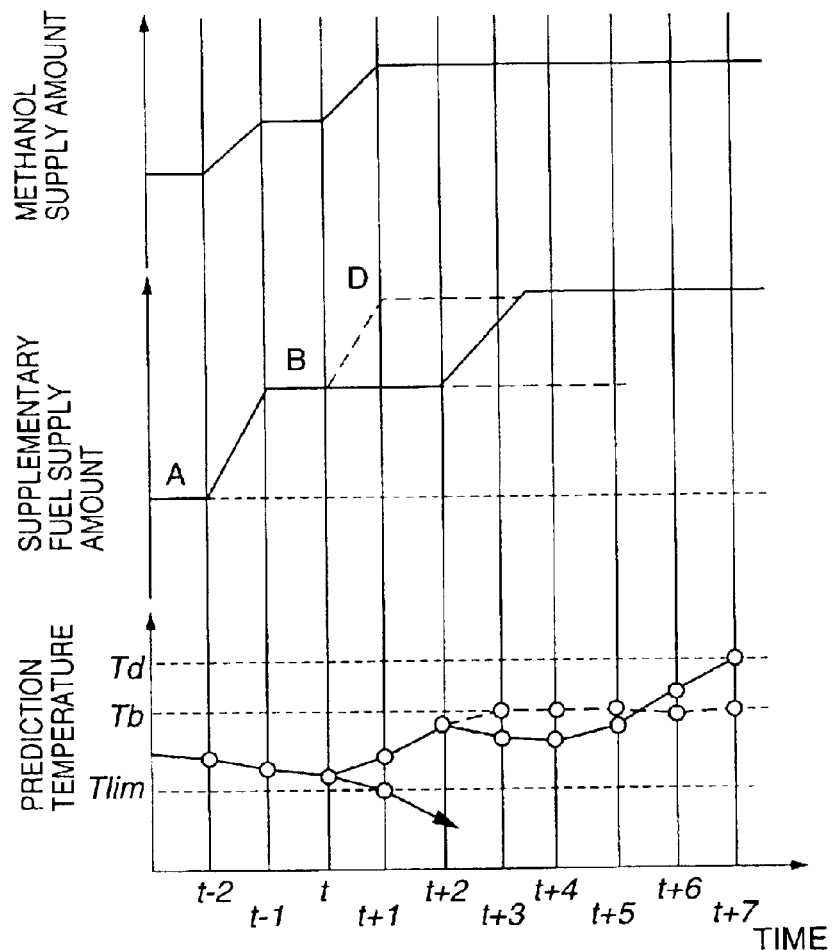

COMBUSTOR TEMPERATURE CONTROL OF FUEL CELL POWER PLANT

FIELD OF THE INVENTION

This invention relates to temperature control of a combustor in a fuel cell power plant which uses reformate gas.

BACKGROUND OF THE INVENTION

Tokkai 2000-178001 and Tokkai 2000-185903 published by the Japanese Patent Office in 2000 disclose a temperature control of a vaporizer of a fuel cell power plant which uses reformate gas.

The fuel cell power plant is provided with a fuel cell stack which generates electricity by a reaction of reformate gas, a reformer which reforms vaporized fuel and generates reformate gas, a vaporizer which vaporizes liquid fuel, and a combustor which heats the vaporizer. The combustor burns anode effluent discharged from the anode of the fuel cell stack, and heats the vaporizer by combustion gas.

Supplementary fuel is also supplied to the combustor and the combustor burns the supplementary fuel together with the anode effluent to generate combustion gas. When liquid fuel supply to the vaporizer is increased, heat required to vaporize the liquid fuel is also increased. Accordingly the supply of supplementary fuel to the combustor is increased to increase the temperature of combustion gas. Methanol is used for the liquid fuel and supplementary fuel.

SUMMARY OF THE INVENTION

Supplementary fuel supplied to the combustor first vaporizes by the heat of the combustor, and thereafter is burnt to generate combustion gas. When the supply amount of the supplementary fuel is increased, the latent heat of vaporization is also increased that makes the temperature in the combustor temporarily fall. Although the combustion of the vaporized fuel thereafter raises the temperature, if the temperature by this temporary fall becomes lower than the combustion stall temperature, the combustion of the fuel in the combustor cannot be maintained.

According to the prior art, when the temperature in the combustor falls, the supplementary fuel supply is increased. As a result, the temperature of the combustor falls still further.

When the temperature of the combustor falls, the temperature of the vaporizer also falls. If there is a shortfall in the power generation amount by the fuel cell stack due to the temperature fall in the vaporizer, a secondary battery discharges power in order to fill up the shortfall in power generation. As a consequence, the load on the secondary battery is increased. When the temperature of the vaporizer falls, a part of the liquid fuel may be provided to the reformer without being vaporized. If the fuel in the liquid state flows into the reformer, it deteriorates the reforming performance of the reformer and increases the generation of carbon monoxide in the reformer. Carbon monoxide is known to cause the poisoning of the fuel cell stack and adversely affects the power generation performance of the fuel cell stack.

It is therefore an object of this invention to maintain the temperature of the combustor used for a fuel cell power plant within a preferred range.

In order to achieve the above object, this invention provides a fuel cell power plant, comprising a combustor which generates heat due to combustion of fuel, a vaporizer which applies heat provided from the combustor to a liquid source material and generate a vaporized source material, a fuel cell stack which generates electric power using the vaporized source material, a fuel supply device which supply fuel to the combustor, a sensor which detects a power generation requirement of the fuel cell stack, and a programmable controller.

The programmable controller is programmed to calculate a liquid source material supply amount to the vaporizer based on the power generation requirement, calculate a fuel supply amount of the fuel supply device based on the liquid source material supply amount to the vaporizer, calculate a prediction temperature of the combustor based on the fuel supply amount of the fuel supply device, and control the fuel supply amount of the fuel supply device to prevent the prediction temperature from falling below a predetermined temperature.

This invention also provides a control method for such a fuel cell power plant that comprises a combustor which generates heat due to combustion of fuel, a vaporizer which applies heat provided from the combustor to a liquid source material and generate a vaporized source material, a fuel cell stack which generates electric power using the vaporized source material, and a fuel supply device which supply fuel to the combustor. The control method comprises detecting a power generation requirement of the fuel cell stack, calculating a liquid source material supply amount to the vaporizer based on the power generation requirement, calculating the fuel supply amount of the fuel supply device based on the liquid source material supply amount to the vaporizer, calculating a prediction temperature of the combustor based on the fuel supply amount of the fuel supply device, and controlling the fuel supply amount of the fuel supply device to prevent the prediction temperature from falling below a predetermined temperature.

The details as well as other features and advantages of this invention are set forth in the remainder of the specification and are shown in the accompanying drawings.

BRIEF DESCRIPTION OF THE DRAWINGS

FIGS. 3A–3C are timing charts describing a relation between an increase in a supplementary fuel supply amount to a combustor of the fuel cell power plant and a resultant temperature variation of the combustor.

FIGS. 4A–4C are similar to FIGS. 3A–3C but showing a case where the supplementary fuel supply amount is gradually increased.

FIGS. 5A–5C are similar to FIGS. 4A–4C but showing a case in different situation.

DESCRIPTION OF THE PREFERRED EMBODIMENTS

Figure 1:
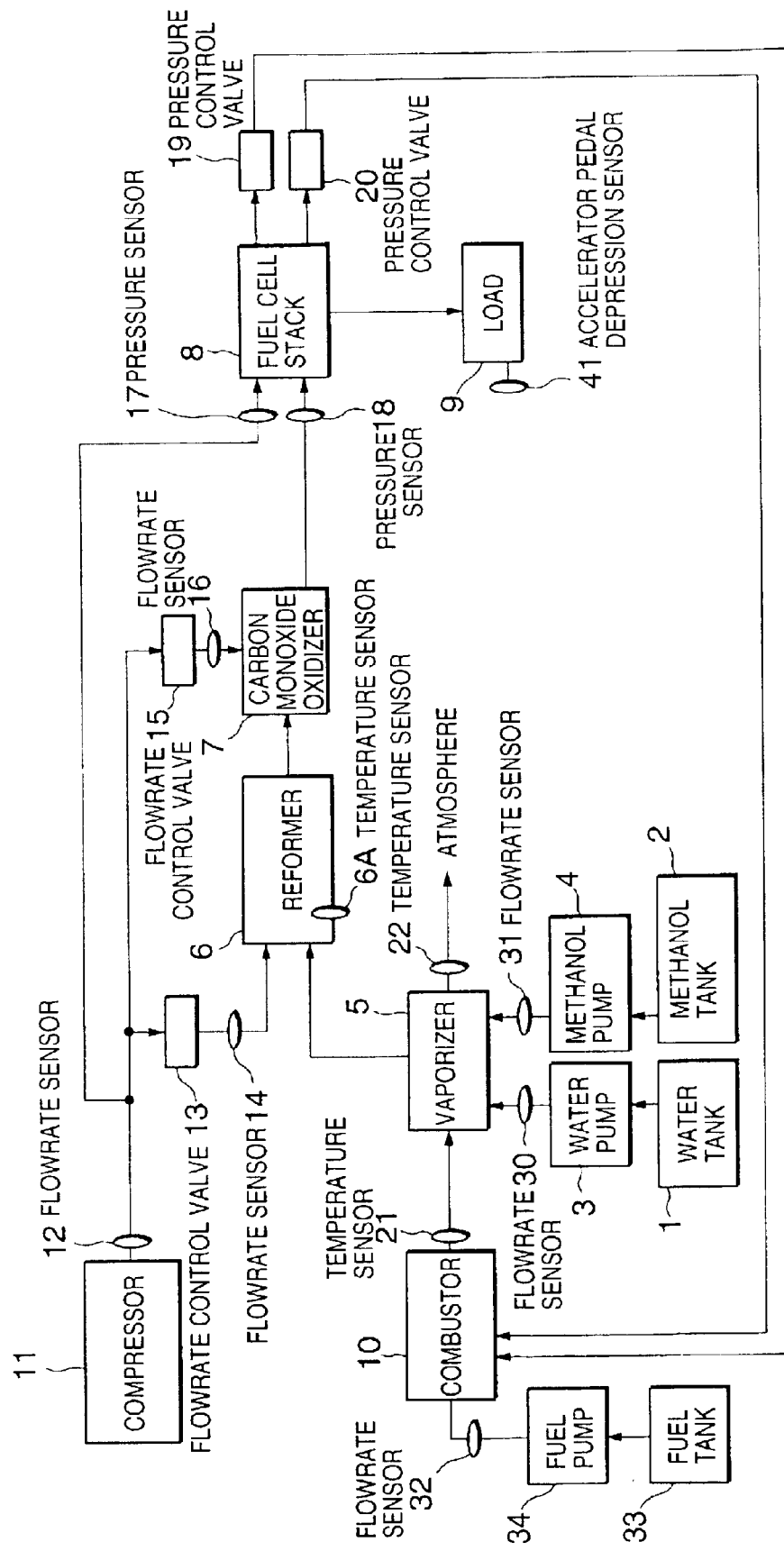
FIG. 1 is a schematic diagram of a fuel cell power plant according to this invention.

Referring to FIG. 1 of the drawings, a fuel cell power plant as a motive force source of a vehicle is provided with a fuel cell stack 8 which generates electricity by the reaction of hydrogen and air. The fuel cell stack 8 is a stack of so-called polymer electrolyte fuel cells which generate power using hydrogen-rich gas which contains a large amount of hydrogen, and air supplied from a compressor 11. The power generated by the fuel cell stack 8 is consumed by a load 9, such as an electric motor and a secondary battery.

The hydrogen-rich gas is generated from methanol and water. For this reason, the fuel cell power plant is provided with a water tank 1 and a methanol tank 2, a vaporizer 5 which vaporizes the water and methanol, a reformer 6 which generates reformate gas from the gaseous mixture of water vapor and methanol vapor, and a carbon monoxide oxidizer 7 which removes carbon monoxide (CO) from the reformate gas. It should be noted, however, that methanol may be replaced by gasoline or any liquid material containing hydrocarbons.

Water in the water tank 1 is supplied by a water pump 3 and methanol in the methanol tank 2 is supplied by a methanol pump 4, respectively, to the vaporizer 5, and respectively injected into the vaporizer 5 by injectors.

The vaporizer 5 vaporizes the water and methanol using the heat generated by a combustor 10.

The reformer 6 is known by U.S. Pat. No. 6,232,005 and performs steam reforming and partial oxidation reforming of the vaporized fuel. Specifically, the reformer 6 generates hydrogen by oxidizing methanol in the presence of an oxidation catalyst. This reaction is an exothermic reaction. On the other hand, the reforming reactor 6 makes methanol react with steam to generate hydrogen. This reaction is an endothermic reaction. In both reactions, reformate gas containing hydrogen is generated from the methanol. For the oxygen supply required for partial oxidation reforming and the temperature control of the reformer 6, air is supplied to the reformer 6 from a compressor 11 via a flowrate control valve 13.

The carbon monoxide oxidizer 7 performs catalytic combustion due to the preferential oxidation of the carbon monoxide in the reformate gas to generate hydrogen-rich gas with a low level of carbon monoxide, using noble metal catalysts such as ruthenium (Ru) and platinum (Pt). To supply the oxygen required for catalytic combustion, air is supplied to the carbon monoxide oxidizer 7 from the compressor 11 via a flowrate control valve 15.

The fuel cell stack 8 discharges hydrogen-containing anode effluent and oxygen-containing cathode effluent as it generates electric power. The anode effluent is supplied via a pressure control valve 19 and the cathode effluent is supplied via a pressure control valve 20 respectively to the combustor 10. The combustor 10 burns the anode effluent and supplementary fuel supplied from a fuel tank 33 via a fuel pump 34 as required in the presence of the oxygen containing cathode effluent, and supplies hot combustion gas to the vaporizer 5. Methanol can be used for the supplementary fuel.

Figure 2:
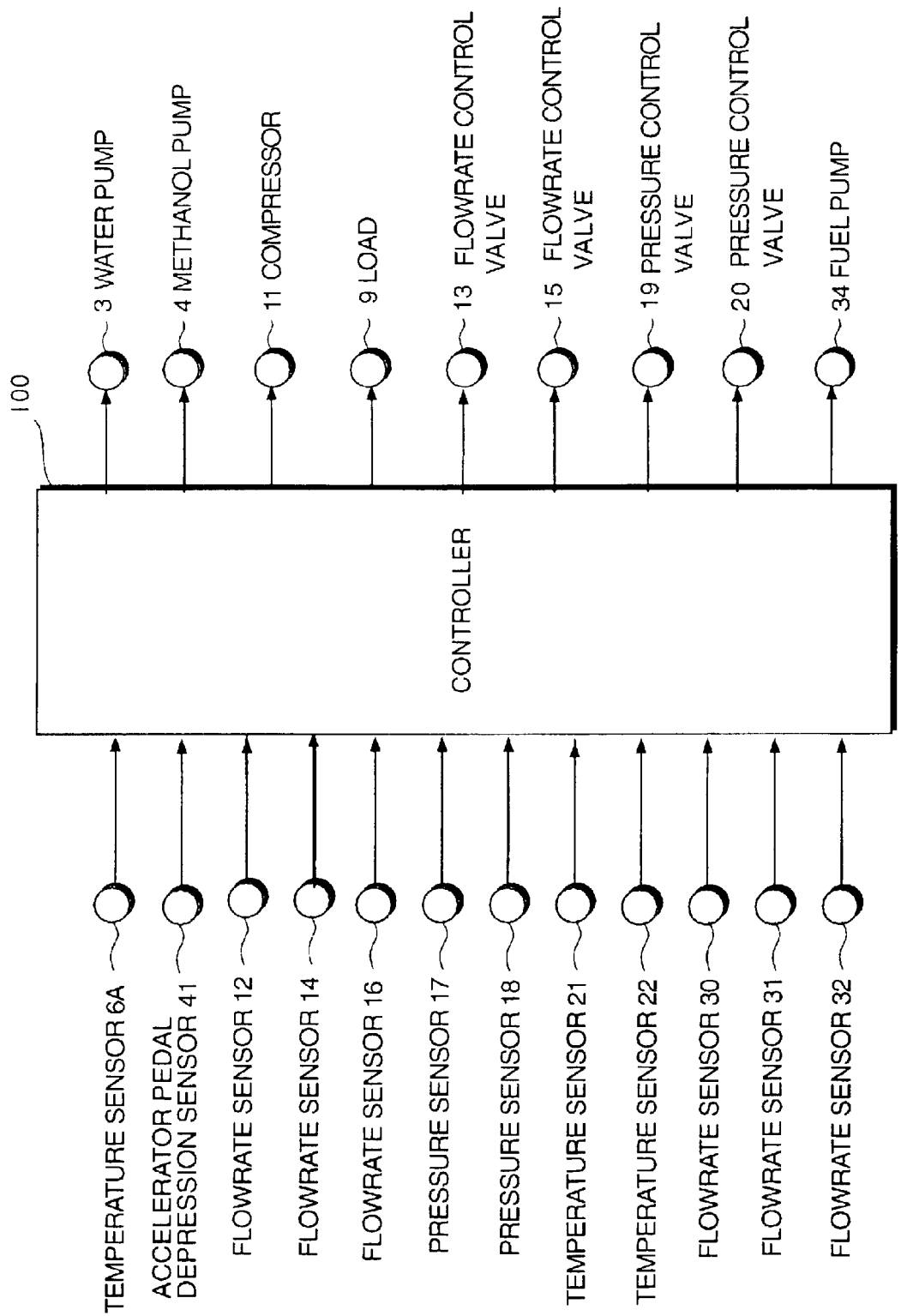
FIG. 2 is a block diagram describing the function of a controller according to this invention.

Referring to FIG. 2, the water supply amount from the water pump 3, the methanol supply amount from the methanol pump 4, the air supply amount from the compressor 11, the power consumption amount by the load 9, the flowrate of flow control valves 13, 15, the pressures of pressure control valves 19, 20 and the fuel supply amount from a fuel pump 34, are controlled by a programmable controller 100.

The controller 100 comprises a microcomputer provided with a central processing unit (CPU), read-only memory (ROM), random access memory (RAM) and input/output interface (I/O interface). The controller may also comprise two or more such microcomputers.

In order to perform the above control by the controller 100, the power plant is provided with the following sensors. These sensors comprise a flowrate sensor 14 which detects an air supply amount to the reformer 6, a flowrate sensor 16 which detects an air supply amount to the carbon monoxide oxidizer 7, a flowrate sensor 12 which detects an air supply amount of the compressor 11, a pressure sensor 17 which detects the pressure of the air supplied to the fuel cell stack 8, a pressure sensor 18 which detects the pressure of the hydrogen-rich gas supplied to the fuel cell stack 8, a temperature sensor 6A which detects the temperature of the reformer 6, a flowrate sensor 30 which detects the water supply amount from the water pump 3, a flowrate sensor 31 which detects the methanol supply amount from the methanol pump 4, a flowrate sensor 32 which detects the supplementary fuel amount supplied to the combustor 10, a temperature sensor 21 which detects the temperature of the combustion gas supplied to the vaporizer 5 from the combustor 10, an accelerator pedal depression sensor 41 which detects a depression amount of an accelerator pedal with which the vehicle is provided, and a temperature sensor 22 which detects the temperature of the combustion gas discharged in the atmosphere after it has heated the vaporizer 5. The detected data are input into the controller from respective sensors in the form of signals.

The controller 100 controls the air amount supplied to the reformer 6 and carbon monoxide oxidizer 7 from the compressor 11 by operating the flow control valves 13, 15. The controller 100 performs control so that the air pressure and hydrogen-rich gas pressure respectively become equal to target values suitable for power generation by operating the pressure control valves 19, 20. Since the compressor 11 supplies air to the fuel cell stack as well as to the reformer 6 and carbon monoxide oxidizer 7, controlling the air pressure supplied to the fuel cell stack 8 also means controlling the air pressure supplied to the reformer 6 and carbon monoxide oxidizer 7.

The controller 100 also controls the air amount supplied to the fuel cell stack 8 as follows.

In the combustor 10, the anode effluent and supplementary fuel supplied by the fuel pump 34 are burnt in the presence of the oxygen containing cathode effluent. The amount of the cathode effluent is determined according to the air amount supplied to the fuel cell stack 8. Hence, the controller 100 determines the air amount to be supplied to the fuel cell stack 8 so that the air-fuel ratio of the gaseous mixture for burning coincides with a target air-fuel ratio.

The controller 100 also calculates the amount of water vapor and methanol vapor supplied to the reformer 6 from the methanol amount and water amount supplied to the vaporizer 5. The air amount required for the partial oxidation reaction of the reformer 6 and air amount required for the selective oxidation reaction of the carbon monoxide oxidizer 7 are then calculated from the amount of the water vapor and methanol vapor. Also, the air amount supplied to the reformer 6 is determined based on the detection temperature of the temperature sensor 6A so that the temperature of the reformer 6 is maintained within a temperature range suitable for the reforming reaction.

The controller 100 controls the rotation speed of the compressor 11 so that the total air supply amount detected by the flowrate sensor 12 is equal to the total air amount supplied to the reformer 6, the carbon monoxide oxidizer 7 and the fuel cell stack 8 determined in this way. Flow control valves 13, 15 are controlled so that the air amount requirement of the reformer 6 and carbon monoxide oxidizer 7 is satisfied.

The controller 100 also determines target amounts of water and methanol supplied to the vaporizer 5, based on the power generation amount of the fuel cell stack 8 required by the load 9, and controls the rotation speed of the water pump 3 and methanol pump 4 so that the water amount and methanol amount detected by the flowrate sensors 30, 31 coincide with the target supply amounts.

The controller 100 computes the electric power generation amount of the fuel cell stack 8 required by the load 9 based on the depression amount of the accelerator pedal depression amount detected by the accelerator pedal depression sensor 41, determines a target electric current consumption of the load 9 according to the depression amount of the accelerator pedal, and controls the load 9 so that the electric current consumption of the load 9 is equal to the target electric current consumption.

The controller 100 calculates the target temperature of the combustor 10 in order that the vaporizer 5 vaporizes the target supply amount of methanol and water. The controller 100 further determines the target fuel supply amount to the combustor 10, and controls operation of the fuel pump 34 based on the target fuel supply amount so that this target temperature is realized. For this purpose, the controller 100 calculates the amount of anode effluent discharged from the fuel cell stack 8 from the methanol supply amount detected by the flowrate sensor 31.

When power generation requirement of the fuel cell stack 8 increases, the supply amount of methanol and water to the vaporizer 5 also increases. Accordingly, vaporizer 5 requires more heat in order to vaporize the increased methanol and water. However, even if a supplementary fuel supply amount to the combustor 10 is increased in order to increase the temperature of the combustor 10 which supplies this heat, the temperature of the combustor 10 will not rise promptly for the following reason.

Supplementary fuel supplied to the combustor 10 is vaporized consuming heat of the combustor 10 and is burnt in the vaporized state. When the supplementary fuel supply amount is increased, the latent heat of vaporization also increases and makes the temperature in the combustor temporarily fall. If the supplementary fuel supply amount is further increased to compensate for this temperature fall, the temperature of the combustor 10 falls still further and may become lower than the combustion stall temperature. When methanol which is known to have large latent heat is used as supplementary fuel, such a temporary fall of temperature of the combustor 10 is significant.

According to this fuel cell power plant, in order to prevent the temperature of the combustor 10 from temporarily falling below the combustion stall temperature, the controller 100 performs the following control.

Specifically, the controller 100 predicts the temperature variation in the combustor 10 based on the supplementary fuel amount supplied to the combustor 10 which is detected by the flowrate sensor 32 and the temperature of combustion gas detected by the temperature sensor 21, and controls the supplementary fuel amount supplied to the combustor 10 accordingly.

Next, referring to FIGS. 3A–3C, the concept of this control will be described.

A case where methanol supply amount to the vaporizer 5 is increased from a time t until a time t+1 as shown in FIG. 3A is considered. The methanol supply amount at the time t is termed A, the methanol supply amount at the time t+1 is termed B, and the variation of methanol supply amount during this period is termed $\Delta u(t)$. $\Delta u(t)$ is therefore represented by the relation $\Delta u(t)=B-A$. As the methanol supply amount to the vaporizer 5 increases, the required heat amount of the combustor 10 also increases. If the target temperature of the combustion gas of the combustor 10 is consequently shifted from T0 to T1, the supplementary fuel amount supplied to the combustor 10 increases as shown by the dotted line in FIG. 3B so as to realize the new target temperature T1.

In the combustor 10, however, the temperature temporarily falls due to the increase in the supplementary fuel amount. Due to the time required to vaporize the increased amount of supplementary fuel, the temperature continues to fall even after the time t+1 when the increase in the supplementary fuel supply amount stops, and the temperature reaches the lowest value at a time t+2. In this figure, the temperatures before the time t comprise the detected values from the temperature sensor 21 and the temperatures after the time t+1 are the values predicted by the controller 100.

After the time t+2, the temperature of the combustor 10 shifts to an increasing direction. At a time t5, it reaches the target temperature T1 that is higher than the temperature T0 before the time t and stabilizes at that value thereafter.

In this temperature variation, if the lowest value at the time t+2 is still higher than a lower limiting temperature Tlim as shown by the dotted line in FIG. 3C, the temperature of the combustor will rise after the time t+2. Herein the lower limiting temperature Tlim is a value defined according to the combustion stall temperature. If on the other hand the lowest value at the time t+2 is lower than the lower limiting temperature Tlim as shown by the solid line in the figure, the combustor 10 may stop combustion. When such a situation is anticipated, therefore, the value of $\Delta u(t)$ should not be set equal to B–A at the time t.

Next, referring to FIG. 4B, it is possible to prevent the temperature of the combustor 10 from falling below the lower limiting temperature Tlim by gradually increasing the supplementary fuel supply amount from the value A to the value B in a stepwise fashion.

In order to gradually increase the supplementary fuel supply amount, the controller 100 set the variation $\Delta u(t)$ in the following manner.

$$\Delta u(t)=C-A$$

$$\Delta u(t+1)=\Delta u(t+2)=0$$

$$\Delta u(t+3)=B-C$$

where, A<B<C.

Due to the above settings, the lowest temperature at the time t+2 is prevented from falling below the lower limiting temperature Tlim. The supplementary fuel supply amount increases further at a time t+3 when the temperature of the combustor 10 again starts to rise, but the lowest temperature that consequently appears at a time t+5 is also prevented from falling below the lower limiting temperature Tlim. At a time t+8 the temperature of the combustor 10 reaches the target temperature T1.

When none of the prediction temperatures corresponding to the time t+1 or later times is found to be lower than the lower limiting temperature Tlim as shown by the dotted line in FIG. 3C, it is not required to gradually increase the supplementary fuel supply amount in this way. In this case therefore the controller 100 sets $\Delta u(t)=B-A$ to increase the supplementary fuel supply amount during the period from the time t to the time t+1 so as to promptly rise the temperature of the combustor 10.

Next, referring to FIG. 5A, the increase in the methanol supply amount to the vaporizer 5 is performed in two phases, i.e., at the time t−2 and the time t. There is a possibility in this case that the temperature of the combustor falls below the lower limiting temperature Tlim as shown by the arrow 5 in FIG. 5C, if the supplementary fuel supply amount to the combustor 10 is increased from A to B and B to C synchronously with the increase of the methanol supply amount as shown in FIG. 5B.

The temperature drop of the combustor 10 below the lower limiting temperature Tlim is prevented by retarding the increase of the supplementary fuel supply amount from B to C to the time t+2 where the prediction temperature is considered to be high enough. In FIG. 5C, Tb denotes the target temperature of the combustion gas in the combustor 10 corresponding to the methanol supply amount B while Td denotes the target temperature of the combustion gas in the combustor 10 corresponding to the methanol supply amount D.

To summarize the above concept, the target supplementary fuel supply amount to be reached finally is determined such that the prediction temperatures of the combustor 10 converges to the target temperature while the increasing rate thereof is determined such that any of the prediction temperatures would not fall below the lower limiting temperature Tlim due to increase in the supplementary fuel supply amount.

Herein, the larger the number of the prediction temperatures, the higher the precision of the control. In order to lower the computation load of the controller 100, however, it is preferable to decrease the number of the prediction temperatures.

With respect to the case of FIGS. 3A–3C, the above-mentioned control of the supplementary fuel supply amount can be performed with five prediction temperatures from the time t+2 through the time t+6. Further, if the prediction temperatures at the time t+1 and the time t+7 are additionally obtained, the control of the supplementary fuel supply amount can be performed with high precision.

However, since the relation between the supplementary fuel supply amount and the temperature of the combustor 10 varies depending on the operation state of the fuel cell stack 8, the number of the prediction temperatures should also be varied depending thereon.

In the fuel cell power plant, the number of the prediction data is represented by a parameter P and the prediction period is represented by a parameter R. The parameter P is an integer larger than zero, while the parameter R is an integer equal to or larger than zero. The time at which the prediction is performed is set to an integer t. The time intervals of the prediction temperatures are set to unity. To summarize the above, the temperatures from the time t+R+1 to the time t+R+P are respectively predicted at the time t. The parameters P and R are set according to the operation state of the fuel cell stack 8.

In order to perform the temperature prediction, it is necessary to obtain actual data for the supplementary fuel supply amount before the time t as well as estimated data for the supplementary fuel supply amount after the time t. This is because a part of the supplementary fuel supplied before the time t is supposed to remain in the liquid state in the combustor 10 at the time t and is vaporized thereafter. Such liquid fuel remaining in the combustor 10 at the time t is a cause of the temperature fall of the combustor 10 after the time t.

On the other hand, the supplementary fuel supplied just before the time t+R+P will not substantially affect to the temperature variation of the combustor 10. It is therefore possible to omit some of the estimated data for the supplementary fuel supply mount near the time t+R+P in the temperature prediction process.

The number of data required for temperature prediction is represented by a parameter S and a parameter M. The parameter M represents the actual number of actual data for the supplementary fuel supply amount to the combustor 10 before the time t, and the parameter S represents the number of estimated data for the supplementary fuel supply amount to the combustor 10 after the time t. The parameter S may be zero or a positive integer. The parameter M is a positive integer which does not exceed the sum of the parameters R and P.

Therefore, the data used for temperature prediction comprise actual data for the supplementary fuel supply amount from the time t−S to the time t−1, and estimated data for the supplementary fuel supply amount from the time t to the time t+M−1. The values of the parameters S, M are also made to vary according to the operation state of the fuel cell stack 8.

As an example of the characteristics of the parameters R, P, M and S with respect to the operation state of the fuel cell stack 8, the parameters P, R and S are set to larger values while the parameter M is set to a smaller value as the required power generation amount of the fuel cell stack 8 increases.

Regarding the parameters P, R, S, M, optimum values are preset by experiment relative to various operation states of the fuel cell stack 8, and previously stored in the memory of the controller 100.

Each time a temperature prediction is made, the controller 100 reads and applies from a table which stores the values of the parameters P, R. S, M according to the operation state of the fuel cell stack 8.

Next, the temperature prediction performed by the controller 100 will be described.

A known model prediction control theory is applied to this temperature prediction. When the model prediction control theory is applied to the temperature prediction of the combustor 10, the following Equations are obtained.

$$yp = y + Af \cdot \Delta uf + Ao \cdot Auo \quad (1)$$

The variables in Equation (1) can be represented by a (2)–(5) determinant.

yp is a prediction temperature of the combustor 10 represented by the following determinant.

$$yp = [yp(t+R+1), yp(t+R+2), yp(t+R+3), \ldots, yp(t+R+P)]^T \quad (2)$$

y is a measurement temperature of the combustor 10 represented by the following determinant.

$$y = [y(t), y(t), y(t), y(t), \ldots, y(t)]^T \quad (3)$$

Δuf is a predicted variation amount of the supplementary fuel supply represented by the following determinant.

$$\Delta uf = [\Delta u(t), \Delta u(t+1), \Delta u(t+2), \ldots, \Delta u(t+M-1)]^T \quad (4)$$

Δuo is an existing variation amount of the same represented by the following determinant.

$$\Delta uo = [\Delta u(t-1), \Delta u(t-2), \Delta u(t-3), \ldots, \Delta u(t-S),]^T \quad (5)$$

In the above Equations, Af is a model coefficient of P columns and M rows, Ao is a model coefficient of P columns and S rows, D is a difference, T is a transpose of a matrix, t is the present time, and R, P, M, S are the aforesaid parameters.

As shown by Equation (2), a prediction temperature yp is expressed by a matrix of P columns and one row having the P prediction temperatures from the time t+R+1 to the time t+P as elements. The measured temperature y, as shown by Equation (3), can be represented by a matrix of P columns and one row having the present temperature of the combustor 10 detected by the temperature sensor 21 as elements.

The prediction variation amount Δuf, as shown by Equation (4), can be represented by a matrix of M columns and one row having the supplementary fuel supply amounts predicted from the time t to the time t+M−1 as elements. The measured variation amount Δuo can be represented by a determinant having the measured supplementary fuel supply amounts from the time t−1 to the time t−S as elements. The predicted variation amount Δuf and measured variation amount Δuo both show variation amounts each time the process is executed.

The model coefficient Af is represented by a matrix of P columns and M rows, and it shows to what extent the prediction variation amount Δuf is reflected in the prediction temperature. The model coefficient Ao is a matrix of P columns and S rows, and shows to what extent the measured variation amount Δuo is reflected in the prediction temperature yp. The model coefficient Af and model coefficient Ao depend on the model parameters R, P, M, S.

The time interval may be set in various units, but here, it is set to a hundred milliseconds which is equal to the process execution interval. Therefore, the time t+R means 0.1·R seconds after the time t.

To obtain the prediction temperature yp, the prediction variation amount Δuf is required in addition to the existing variation amount Δuo which is a measured value, and the measured temperature y. The controller 100 calculates the prediction variation amount Δuf by the following Equations (6)–(8).

$$\Delta uf = \frac{Af^T \cdot \lambda \cdot (sp - y - Ao \cdot \Delta uo)}{Af^T \cdot \lambda \cdot Af + \Phi} \quad (6)$$

where, sp=target temperature of combustor 10, $$\Phi = \text{weighting coefficient which adjusts the shift in the} \quad (7)$$
$$\text{supplementary fuel supply amount}$$
$$= diag[\Phi 1, \Phi 2, \Phi 3, \ldots, \Phi M]$$

$$\lambda = \text{weighting coefficient relating to the discrepancy} \quad (8)$$
$$\text{between the prediction value and the target value}$$
$$= diag[\lambda 1, \lambda 2, \lambda 3, \ldots, \lambda P]$$

diag[ . . . ] in Equations (7) and (8) represents a diagonal matrix.

Equation (6) corresponds to Equation (1) solved for Δuf. More specifically, Equation (6) is set by the least square method so as to minimize the sum of differences between the target temperature sp of the combustor 10 and the prediction temperatures yp at each time from the time t+R+1 to the time t+R+P. In other words, it is a differential form of $(sp-yp)^2$.

The prediction variation amount Δuf can also be calculated other than by the least square method such as by the linear programming method.

As can be seen from Equation (6), to calculate the prediction variation amount Δuf, several parameters are required in addition to the aforesaid model coefficient Af and model coefficient Ao. The target temperature sp which is one of these parameters is represented by a matrix having the required temperature of the combustor 10 relative to the methanol supply amount to the vaporizer 5 as elements.

Figure 6:
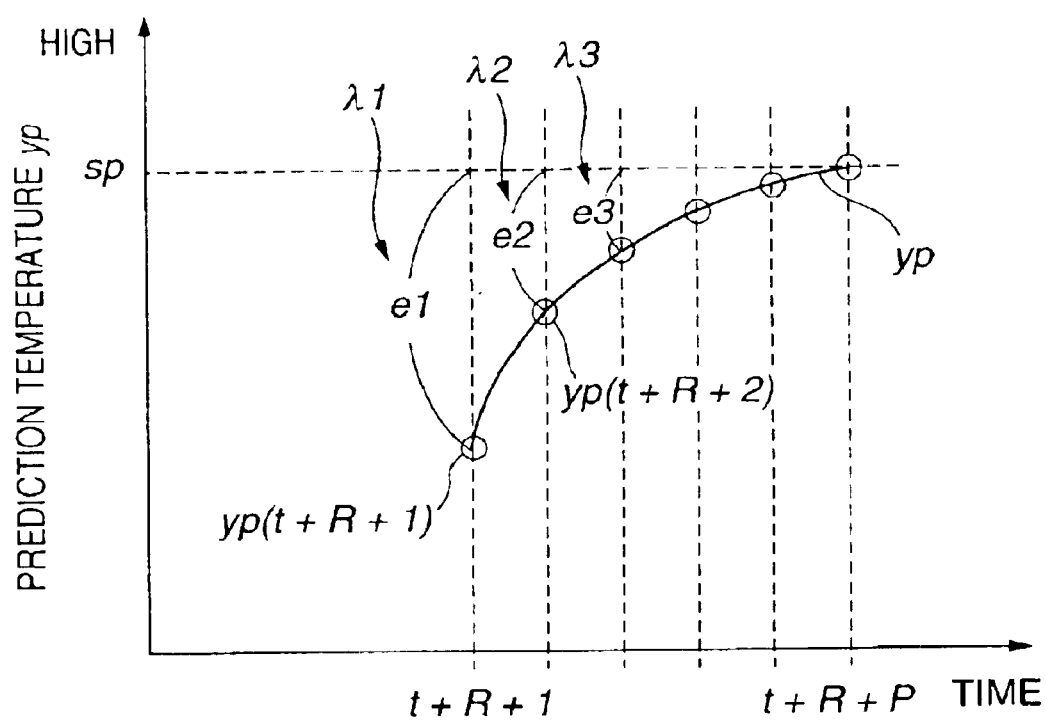
FIG. 6 is a diagram describing a weighting coefficient λ applied by the controller.

Next, the weighting coefficient Φ and weighting coefficient λ will be described referring to FIG. 6.

As can be seen from Equation (8), the weighting coefficient λ is represented by a diagonal matrix having λ1 to λP as elements which specify the weighting relative to the difference between the target temperature sp and prediction temperature yp. As shown in FIG. 6, if i is a natural number from 1 to P, the coefficient λi represents a weighting relative to a difference ei between the target temperature sp and the prediction temperature yp(t+R+i) at the time t+R+i.

When the supplementary fuel supply amount to the combustor 10 undergoes a large variation, the temperature of the combustor 10 also undergoes a large variation, and the detection temperature of the temperature sensor 21 can no longer follow the actual temperature variation. When this situation occurs, the reliability of the temperature measurement value decreases and the temperature control may not be performed properly. Hence, a weighting is applied to the difference using the weighting coefficient λ so that the variation of the supplementary fuel supply amount does not exceed the tracking rate of the temperature sensor 21. The weighting coefficient λ is determined from experiment or by a simulation and previously stored in the memory of the controller 100.

As can be seen from Equation (7), the weighting coefficient Φ is represented by a diagonal matrix with Φ1 to ΦM as elements which specify the weighting relative to the supplementary fuel supply amount variation.

If the weighting coefficient λ is set to diag[1,0,0, . . . 0], the prediction variation amount Δuf that makes the prediction value yp (t+R+1) of the temperature at the time t+R+1 coincide with the target temperature sp, can be calculated. Also, regarding diag[λ1, λ2, λ3, . . . λP], when λi is set to a larger value than zero, the prediction variation amount Δuf that makes all the P prediction temperatures from the time t+R+1 to the time t+R+P coincide with the target temperature sp, is calculated. Such a setting is also possible.

As shown in Equation (4), the prediction variation amount Δuf obtained by solving Equation (6) includes the variation amounts predicted from the time t to the time t+M−1 as elements. By substituting this prediction variation amount Δuf into Equation (1), the temperature variation of the combustor 10 relative to the prediction variation amount Δuf can be predicted.

Next, referring to FIG. 7, the combustor temperature control routine performed by the controller 100 will be described based on the above algorithm. The execution interval of the routine is a hundred milliseconds as described above.

First, in a step S1, the controller 100 determines whether or not it is necessary to modify the settings of the parameters R, P, M, S based on the operation state of the fuel cell stack 8.

When modifications are necessary, in a step S2, the parameters R, P, M and S are modified, and the coefficients Af, Ao are recalculated accordingly.

After the processing of the step S2, the controller 100 performs processing of a step S3. When it is determined in the step S1 that modifications of the settings of the parameters R, P, M, S are unnecessary, the controller 100 skips the step S2 and performs the processing of the step S3.

In the step S3, the controller 100 calculates the prediction temperature yp(R+P) of the combustor 10 at a time R+P when the present supplementary fuel supply amount to the combustor 10 is maintained from Equation (1). Specifically, the measured variation amount Δuo and measured temperature y at the present time are substituted into Equation (1), and the prediction temperature yp(R+P) is calculated. Herein the prediction temperature yp(R+P) can be interpreted as the temperature of the combustor 10 after the variation in the temperature of combustor 10 has converged.

In a next step S4, the controller 100, using Equation (6), calculates a new prediction variation amount Δuf related to the supplementary fuel supply amount from the prediction temperature yp(R+P) and the target temperature sp determined according to the methanol supply amount to the vaporizer 5.

By using the prediction temperature yp(R+P) instead of the present temperature to calculate the new prediction variation amount Δuf, an effect of the temporary temperature fluctuation due to the variation in the supplementary fuel supply amount is eliminated. The prediction variation amount Δuf calculated in this way has therefore a high precision.

In a next step S5, the controller 100 calculates the prediction temperature of the combustor 10 from the time R+1 to the time R+P by substituting the new prediction variation amount Δuf into Equation (1).

In a next step S6, the controller 100 determines whether or not any of the prediction temperatures calculated in the step S5 is lower than the lower limiting temperature Tlim. The lower limiting temperature Tlim is a value set based on the combustion stall temperature. The lower limiting temperature Tlim is herein set to 280 degrees centigrade.

If none of the prediction temperatures is lower than the lower limiting value Tlim, the temperature of the combustor 10 will not fail below the lower limiting value Tlim, if the new prediction variation amount Δuf is applied. In this case, the controller 100 performs the processing of a step S11.

When, on the other hand, any of the prediction temperatures is lower than the lower limiting value Tlim, the controller 100 performs the processing of a step S7

In the step S7, the controller compares the prediction variation amount Δuf with a previous value Δuf $_{-1}$ that is the prediction variation amount calculated on the immediately preceding occasion when the routine was performed. When the prediction variation amount Δuf is not larger than the previous value Δuf_, the controller 100 performs the processing of the step S1. When the prediction variation amount Δuf is larger than the previous value Δuf$_{-1}$, the controller 100 performs the processing of a step S8A.

In the step S1, the controller 100 sets a variation amount equal to the prediction variation amount Δuf. After setting the variation amount in the step S1, the controller 100 performs the processing of a step S9.

In the step S8A, the controller 100 set the variation amount equal to the previous value Δuf$_{-1}$. After setting the variation amount in the step S8A, the controller 100 performs the processing of the step S9.

In the step S9, the controller 100 outputs a signal corresponding to the variation amount to the fuel pump 34 and thereafter terminates the routine.

According to this combustor temperature control routine, when any of the prediction temperatures is lower than the lower limiting value Tlim and the prediction variation amount Δuf is larger than the previous value Δuf$_{-1}$, the previous value Δuf$_{-1}$ is applied for the control of the supplementary fuel supply amount. In other words, only when all the prediction temperatures are larger than the lower limiting temperature Tlim, the variation amount larger than the previous value is applied. The temperature of the combustor 10 is therefore always maintained higher than the lower limiting temperature Tlim.

Next, referring to FIG. 8, a second embodiment of this invention related to the combustor temperature control routine will be described.

Figure 7:
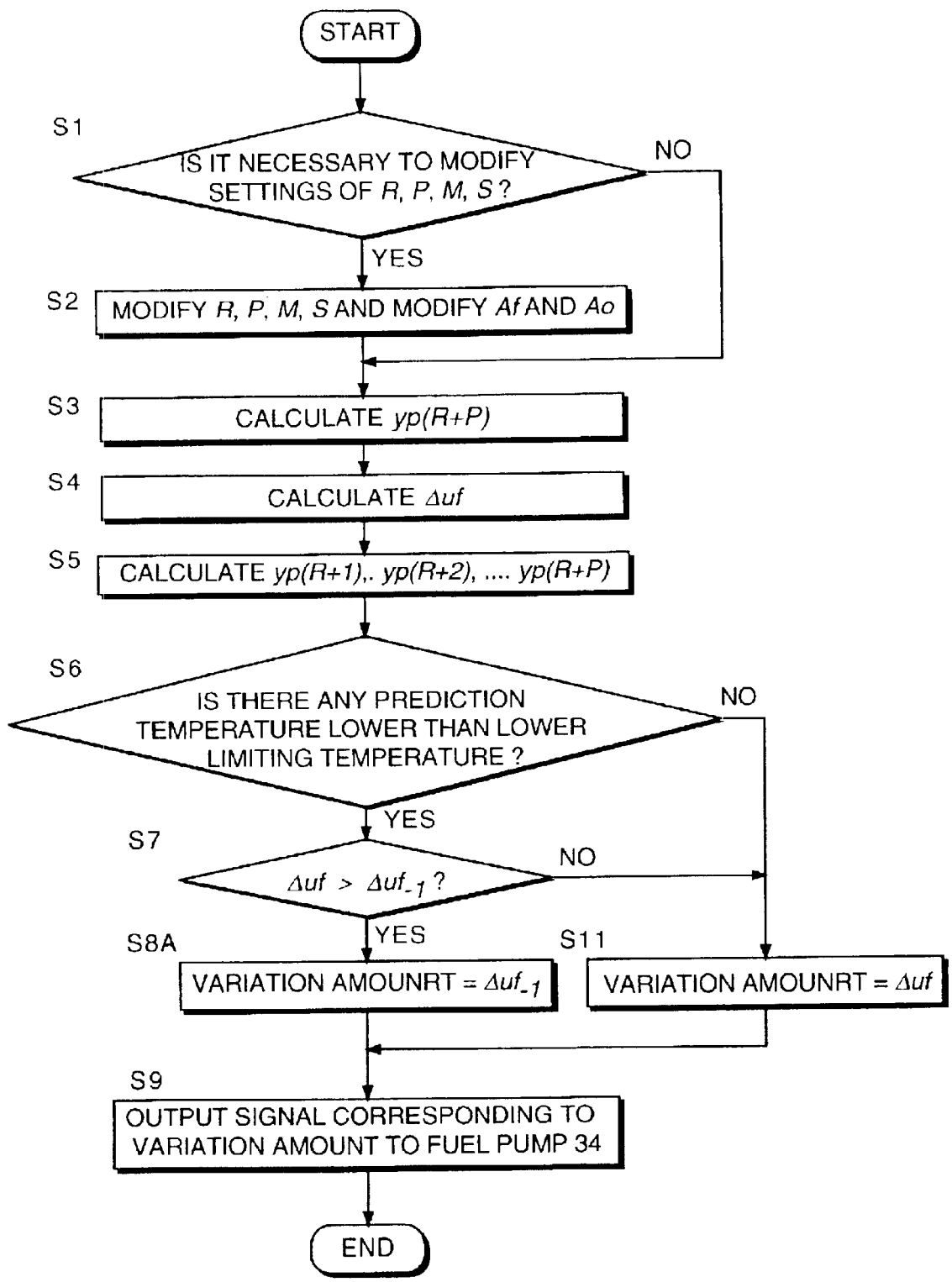
FIG. 7 is a flowchart describing a combustor temperature control routine performed by the controller.

When the supplementary fuel supply amount is limited by the execution of the routine of FIG. 7, it will take a relatively long time until the temperature of the combustor 10 reaches the target temperature sp after the increase in the methanol supply amount to the vaporizer 5 as shown in FIG. 4C or FIG. 5C.

According to this embodiment, in order to shorten the time required until the temperature of the combustor 10 reaches the target temperature sp, the supplementary fuel supply amount is increased to as much as possible within a range that will not cause the temperature fall of the combustor 10 below the lower limiting temperature Tlim.

Figure 8:
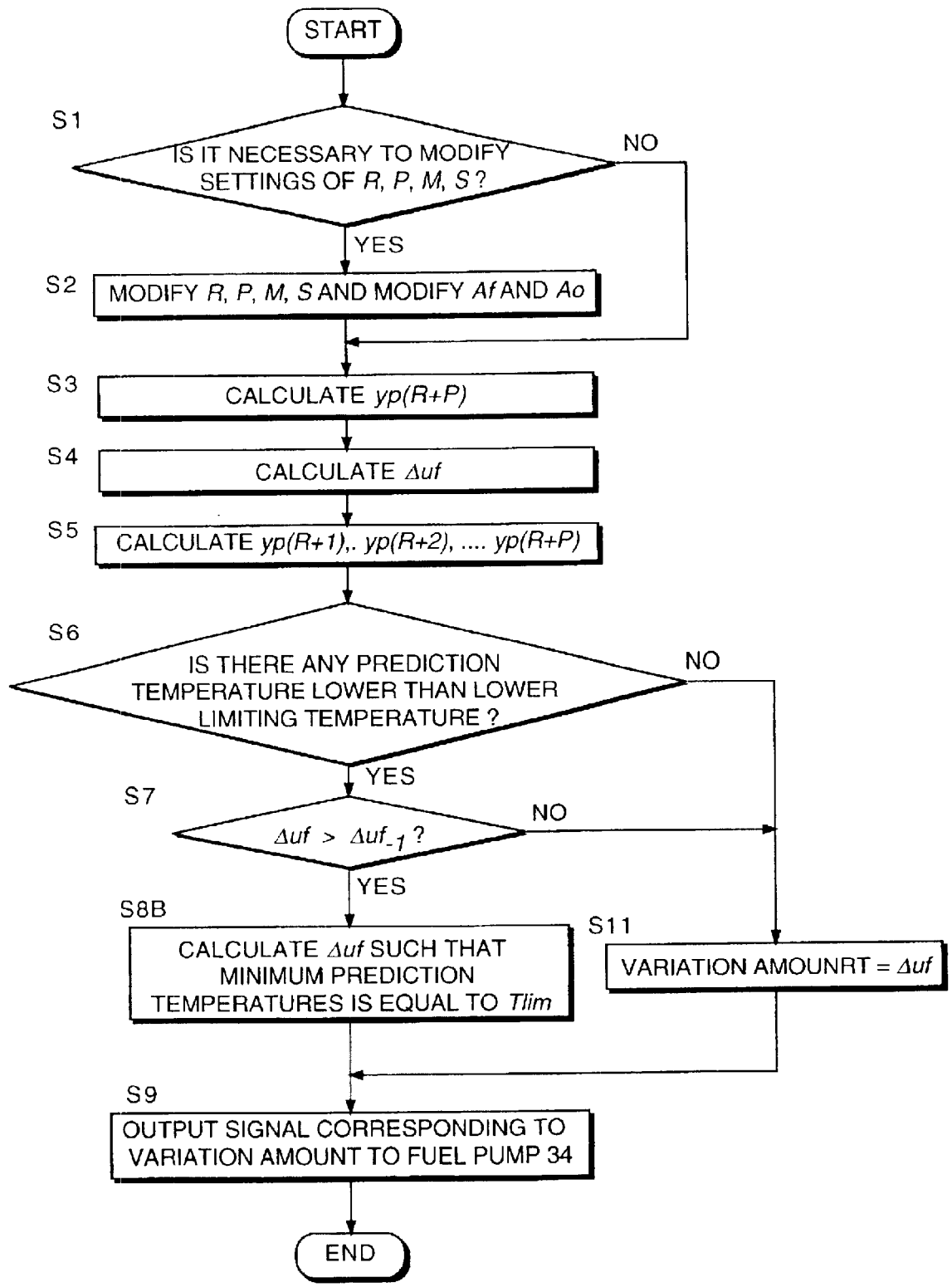
FIG. 8 is similar to FIG. 7 but showing a second embodiment of this invention.

In a routine of FIG. 8 which is exclusively applied for this purpose, a step S8B is provided in place of the step S8A of the routine of FIG. 7.

In the step S8B, the controller 100 recalculates the prediction variation amount Δuf such that the minimum value of the prediction temperatures is equal to the lower limiting temperature Tlim. Specifically, the target temperature sp is set equal to the lower limiting temperature Tlim and the calculation of the prediction variation amount Δuf in the same way as in the step S4 is performed.

Other steps of the routine are identical to those of the routine of FIG. 7.

According to this embodiment, the temperature fall due to increase in the supplementary fuel supply amount to the combustor 10 and the temperature rise due to combustion of already supplied supplementary fuel in the combustor 10 are cancelled out with each other, and the temperature of the combustor is maintained at the lower limiting temperature Tlim. In other words, the supplementary fuel supply amount is increased as much as possible within a range that will not cause the temperature of the combustor 10 to fall below the lower limiting temperature Tlim.

Accordingly, until the supplementary fuel supply amount reaches the amount corresponding to the original target temperature of combustor 10, the temperature of the combustor 10 is maintained at the lower limiting temperature Tλim. After the increase in the supplementary fuel supply amount to the combustor 10 is complete, the temperature of the combustor 10 rises to the original target temperature.

In the calculation of the step S8, if the target temperature is set equal to the lower limiting temperature Tlim, there is a possibility that the temperature of the combustor 10 instantaneously falls below the lower limiting temperature Tlim during the control process. It is therefore preferable to set the target temperature sp to a value slightly higher than the lower limiting temperature Tlim or set the lower limiting temperature Tlim to a value slightly higher than the combustion stall temperature.

The contents of Tokugan 2001-157049, with a filing date of May 25, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings. For example, in any of the above embodiments, instead of applying Equation (6) to the calculation of the prediction variation amount Δuf, the prediction variation amount Δuf may be calculated by applying a coefficient or map that specifies the relation between the supplementary fuel supply amount to the combustor 10 and the temperature thereof. Such a coefficient or map can be obtained by performing a step response experiment that obtains a result through a step by step process.

System identification theory is known as a method for promoting a mathematical model of a dynamic system based on measured data. When the system identification is applied to specify the relation between the variation amount Δuf of the supplementary fuel supply amount and the variation amount Δya of the temperature of the combustor 10, the following Equation (9) is obtained.

$$\Delta ya = G(s) \cdot \Delta uf \qquad (9)$$

where, Dya=temperature variation of the combustor 10,
Δuf=variation amount of supplementary fuel supply to the combustor 10, and
G(s)=transfer function.

$$G(s) = \frac{K}{a \cdot s + 1} \qquad (10)$$

where, K=process gain,
a=slope, and
s=Laplacian operator.

If the process gain K and slope a are previously found by the above step response experiment, and the difference between the target temperature of the combustor 10 and the present temperature is substituted into Dya of Equation (9), the variation amount Δuf of the supplementary fuel supply amount to the combustor 10 required to make the temperature of the combustor 10 equal to the lower limiting temperature Tlim, can be calculated.

As can be understood from the above example, various methods other than Equation (6) can be applied to specify the relation between the variation amount Δuf of the supplementary fuel supply amount to the combustor 10 and the variation amount of the temperature thereof.

The embodiments of this invention in which an exclusive property or privilege is claimed are defined as follows:

What is claimed is:

1. A fuel cell power plant, comprising:
   a combustor which generates heat due to combustion of fuel;
   a vaporizer which applies heat provided from the combustor to a liquid source material and generate a vaporized source material;
   a fuel cell stack which generates electric power using the vaporized source material;
   a fuel supply device which supply fuel to the combustor;
   a sensor which detects a power generation requirement of the fuel cell stack; and
   a programmable controller programmed to:
   calculate a liquid source material supply amount to the vaporizer based on the power generation requirement;
   calculate a fuel supply amount of the fuel supply device based on the liquid source material supply amount to the vaporizer;
   calculate a prediction temperature of the combustor based on the fuel supply amount of the fuel supply device; and
   control the fuel supply amount of the fuel supply device to prevent the prediction temperature from falling below a predetermined temperature.

2. The fuel cell power plant as defined in claim 1, wherein the predetermined temperature is set equal to a minimum temperature at which the combustor can maintain combustion of fuel.

3. The fuel cell power plant as defined in claim 1, wherein the controller is further programmed to control the fuel supply amount of the fuel supply device to cause the prediction temperature of the combustor to coincide with the predetermined temperature.

4. The fuel cell power plant as defined in claim 1, wherein the controller is further programmed to suppress an increase in the fuel supply amount of the fuel supply device to prevent the prediction temperature from falling below the predetermined temperature.

5. The fuel cell power plant as defined in claim 4, wherein the prediction temperature comprises a plurality of prediction temperatures in a time sequence, and the controller is further programmed to suppress the increase in the fuel supply amount of the fuel supply device when any one of the prediction temperatures falls below the predetermined temperature.

6. The fuel cell power plant as defined in claim 1, wherein the controller is further programmed to calculate a convergence temperature of the combustor based on a present fuel supply amount to the combustor, the convergence temperature being a value to which the temperature of the combustor reaches when a corresponding supply amount of fuel is supplied to the combustor, and calculate the fuel supply amount of the fuel supply device according to a difference between a target temperature corresponding to a supply amount of liquid source material to the vaporizer and the convergence temperature.

7. The fuel cell power plant as defined in claim 6, wherein the fuel cell power plant further comprises a temperature sensor which detects a temperature of the combustor, and the controller is further programmed to calculate the convergence temperature according to a variation of the fuel supply amount in the past and a present temperature of the combustor detected by the temperature sensor.

8. A fuel cell power plant, comprising:
   a combustor which generates heat due to combustion of fuel;
   a vaporizer which applies heat provided from the combustor to a liquid source material and generate a vaporized source material;
   a fuel cell stack which generates electric power using the vaporized source material;
   a fuel supply device which supply fuel to the combustor;
   means for detecting a power generation requirement of the fuel cell stack;
   means for calculating a liquid source material supply amount to the vaporizer based on the power generation requirement;
   means for calculating a fuel supply amount of the fuel supply device based on the liquid source material supply amount to the vaporizer;
   means for calculating a prediction temperature of the combustor based on the fuel supply amount of the fuel supply device; and
   means for controlling the fuel supply amount of the fuel supply device to prevent the prediction temperature from falling below a predetermined temperature.

9. Control method for a fuel cell power plant, the fuel cell power plant comprising a combustor which generates heat due to combustion of fuel, a vaporizer which applies heat provided from the combustor to a liquid source material and generate a vaporized source material, a fuel cell stack which generates electric power using the vaporized source material, and a fuel supply device which supply fuel to the combustor, the control method comprising:

detecting a power generation requirement of the fuel cell stack;

calculating a liquid source material supply amount to the vaporizer based on the power generation requirement;

calculating the fuel supply amount of the fuel supply device based on the liquid source material supply amount to the vaporizer;

calculating a prediction temperature of the combustor based on the fuel supply amount of the fuel supply device; and controlling the fuel supply amount of the fuel supply device to prevent the prediction temperature from falling below a predetermined temperature.

* * * * *